United States Patent
Harrison et al.

(10) Patent No.: US 7,801,302 B2
(45) Date of Patent: Sep. 21, 2010

(54) CRYPTOGRAPHIC METHOD AND APPARATUS

(75) Inventors: Keith Alexander Harrison, Monmouth (GB); Liqun Chen, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1503 days.

(21) Appl. No.: 11/150,623

(22) Filed: Jun. 10, 2005

(65) Prior Publication Data

US 2005/0276414 A1 Dec. 15, 2005

(30) Foreign Application Priority Data

Jun. 11, 2004 (GB) ................... 0413056.3

(51) Int. Cl.
*H04K 1/00* (2006.01)
*H04L 9/00* (2006.01)
*H04L 29/06* (2006.01)
*H04L 9/32* (2006.01)
*G06F 17/00* (2006.01)
*G07F 7/10* (2006.01)
*G07F 7/06* (2006.01)
*H04L 9/08* (2006.01)

(52) U.S. Cl. .......................... 380/30; 380/28; 380/44; 713/155; 713/170; 713/180; 726/1

(58) Field of Classification Search .................. 380/30
See application file for complete search history.

(56) References Cited

U.S. PATENT DOCUMENTS

| 6,275,936 B1 | 8/2001 | Kyojima et al. ............. 713/182 |
| 7,398,393 B2 * | 7/2008 | Mont et al. .................. 713/168 |
| 2002/0103999 A1 | 8/2002 | Camnisch et al. |
| 2003/0095661 A1 | 5/2003 | Harrison ..................... 380/231 |

(Continued)

FOREIGN PATENT DOCUMENTS

GB 2351594 A * 1/2001

(Continued)

OTHER PUBLICATIONS

Christian Schridde, Matthew Smith, Bernd Freisleben, "TrueIP: prevention of IP spoofing attacks using identity-based cryptography", Oct. 2009, SIN '09: Proceedings of the 2nd international conference on Security of information and networks, Publisher: ACM, pp. 128-137.*

(Continued)

*Primary Examiner*—Michael Pyzocha
*Assistant Examiner*—Courtney D Fields

(57) ABSTRACT

A cryptographic method and apparatus is provided in which a first party receives and modifies a public key for which there exists a corresponding private key held by a second party. The public key is modified by exponentiating at least one element of the received public key using as exponent a hash of a string that comprises information concerning at least one action to be taken by the second party. The string is made available to the second party to enable the latter to modify its private key to compliment the modified public key. In a preferred embodiment, the method and apparatus are applied to the use of the ElGamal encryption/decryption scheme, with the second party acting as a trusted authority that only releases the decrypted message to a third party if the latter satisfies an identity condition specified in the string.

29 Claims, 3 Drawing Sheets

U.S. PATENT DOCUMENTS

| | | | |
|---|---|---|---|
| 2004/0151310 A1 | 8/2004 | Fu et al. | |
| 2004/0252830 A1 | 12/2004 | Chen et al. | |
| 2005/0002528 A1 | 1/2005 | Chen et al. | 380/255 |
| 2007/0041583 A1* | 2/2007 | Boneh et al. | 380/28 |

FOREIGN PATENT DOCUMENTS

| | | |
|---|---|---|
| GB | 2 384 406 A | 7/2003 |
| GB | 2 395 872 A | 6/2004 |
| WO | 03/017559 A2 | 2/2003 |
| WO | WO 03/063410 A1 | 7/2003 |

OTHER PUBLICATIONS

Cramer, e al., "Signature Schemes Based on the Strong RSA Assumption," (2000).

Tanaka, "Identity-Based Non-Interactive Key Sharing Equivalent to RSA Public-Key Cryptosystem," (1998).

Boneh, D. and M. Franklin, "Identity-Based Encryption from the Weil Pairing," *Advances in Cryptology—CRYPTO 2001*, LNCS 2139, pp. 213-229, Springer-Verlag (2001).

Boneh, D., et al., "Identity-Based Mediated RSA," *3rd Workshop on Information Security Application*, Jeju Island, Korea, 12 pages (Aug. 2002).

Cocks, C., "An Identity Based Encryption Scheme Based on Quadratic Residues," *Proceedings of the 8th IMA International Conference on Cryptography and Coding*, LNCS 2260, pp. 360-363, Springer-Verlag (2001).

ElGamal, T., "A Public Key Cryptosystem and a Signature Scheme Based on Discrete Logarithms," *IEEE Transactions on Information Theory*, vol. IT-31, No. 4, pp. 469-472 (Jul. 1985).

U.S. Appl. No. 11/166,921, filed Jun. 23, 2005, Harrison et al.

Bellare, M., et al., "Optimal Asymmetric Encryption—How to Encrypt with RSA," *Advances in Cryptology—Europcrypt '94*, pp. 92-111, Springer-Verlag (1994).

Chaum, D., "Blind Signatures for Untraceable Payments," *Advances in Cryptology—Crypto '82*, pp. 199-203, (1998), retrieved from Internet at: http://dsns.csie.netu.edu.tw/research/crypto/HTML/PDF/C82/199.pdf.

Chen, L., et al., "Multiple Trusted Authorities in Identifier Based Cryptography from Pairings on Elliptic Curves," *Hewlett-Packard Technical Reports*, INTERNET: <http://www.hpl.hp.com/techreports/2003/HPL-2003-48.html>, 27 pages total, (Mar. 19, 2003).

ISO/IEC FDIS 1488-2, "Information Technology-Security Techniques-Digital Signatures with appendix- Part 2: Identity-based Mechanisms,": M. Chawrun, ed., 20 pages total (Oct. 6, 1998).

Mohammed, E., et al., "A Blind Signature Scheme Based on ElGamal Signature," *Eurocomm 2000, Information Systems for Enhanced Public Safety and Security*, IEEE/AFCEA, pp. 51-53 (May 17, 2000).

Mont, M., et al., "IBE Applied to Privacy and Identity Management," *HP Labs Technical Report*,, retrieved from Internet at:<http://www.hpl.hp.com/techreports/2003/HPL-2003-101.html>, pp. 1-13 (2003).

* cited by examiner

*Elgamal Encryption/Decryption*

CRYPTOGRAPHIC METHOD AND APPARATUS

FIELD OF THE INVENTION

The present invention relates to a cryptographic method and apparatus; in particular, the present invention relates to an identifier-based cryptographic method and apparatus.

As is well known to persons skilled in the art, in "identifier-based" cryptographic methods the encryption key used to encrypt a message is based on a sender-chosen string and public data, the corresponding decryption key being computed, potentially subsequent to message encryption, using the sender-chosen string and private data associated with the public data. Frequently, the sender-chosen string serves to "identify" the intended message recipient and this has given rise to the use of the label "identifier-based" or "identity-based" generally for these cryptographic methods. However, depending on the application to which such a cryptographic method is put, the sender-chosen string may serve a different purpose to that of identifying the intended recipient and, indeed, may be an arbitrary string having no other purpose than to form the basis of the encryption key. Accordingly, the use of the term "identifier-based" herein in relation to cryptographic methods and apparatus is to be understood simply as implying that the encryption key is based on a sender-chosen, cryptographically unconstrained, string whether or not the string serves to identify the intended recipient, and that the corresponding decryption key can be subsequently computed from the string. Furthermore, as used herein the term "string" is simply intended to imply an ordered series of bits whether derived from a character string, a serialized image bit map, a digitized sound signal, or any other data source.

BACKGROUND OF THE INVENTION

Identifier-Based Encryption (IBE) is an emerging cryptographic schema A number of IBE cryptographic methods are known, including:
- methods based on "Quadratic Residuosity" as described in the paper: "An identity based encryption scheme based on quadratic residues", C. Cocks, Proceedings of the $8^{th}$ IMA International Conference on Cryptography and Coding LNCS 2260, pp 360-363, Springer-Verlag, 2001;
- methods using Weil or Tate pairings—see, for example: D. Boneh, M. Franklin—"Identity-based Encryption from the Weil Pairing" in *Advances in Cryptology—CRYPTO 2001*, LNCS 2139, pp. 213-229, Springer-Verlag, 2001;
- methods based on mediated RSA as described in the paper "Identity based encryption using mediated RSA", D. Boneh, X. Ding and G. Tsudik, 3rd Workshop on Information Security Application, Jeju Island, Korea, August, 2002.

Generally, in IB encryption/decryption methods, a trusted party carries out one or more actions (such as identity checking) in accordance with information in the sender-chosen string, before enabling a recipient to recover a message encrypted by a message sender. Usually, the trusted party will generate an IB decryption key and provide it to the recipient for the latter to use in decrypting the encrypted message. However, it is also possible to provide IB encryption/decryption methods in which the trusted party must itself carry out the decryption since it involves knowledge of a secret belonging to the trusted party as well as use of the IB decryption key. This is the case for the RSA-based IB method described in U.S. Pat. No. 6,275,936 where the decryption exponent is dynamically computed from the encryption exponent, the latter being a hash of the sender-chosen string. A potential disadvantage of the trusted party carrying out message decryption is that it risks compromising the recipient's privacy. In the afore-mentioned U.S. patent, this potential disadvantage is overcome by the recipient blinding the encrypted message before passing it to the trusted party (a decryption box) and then un-blinding the returned decrypted, but still blinded, message.

It is an object of the present invention to provide novel identifier-based cryptographic methods and systems.

SUMMARY OF THE INVENTION

According to a first aspect of the present invention, there is provided a cryptographic method comprising a first party:
- receiving a public key for which there exists a corresponding private key held by a second party,
- modifying the public key by exponentiating at least one element of the received public key using as exponent a hash of a string, this string comprising information concerning at least one action to be taken by the second party, and
- making available the string to the second party to enable the latter to modify its private key to complement the modified public key.

In preferred embodiments of the invention, the foregoing method is used to provide an identifier-based form of the ElGamal encryption/decryption system. The ElGamal cryptosystem is described in the paper: "A public key cryptosystem and a signature scheme based on discrete logarithms" (IEEE Transactions on Information Theory, Vol. IT-31 No. 4 July 1985, Taher ElGamal) and is itself based on the well-known Diffie-Hellman key distribution scheme.

The identifier-based encryption/decryption methods provided by preferred embodiments of the present invention present a different distribution of computational load to other identifier-based systems (such as the RSA-based system described in the above-referenced U.S. patent) and in appropriate circumstances offers performance advantages over the prior art.

According to a second aspect of the present invention, there is provided a cryptographic method comprising a sender of a message m effecting steps of:
- receiving parameters p, g and y from a trusted party, the parameter y corresponding to $g^x \bmod p$, where x is a secret belonging to the trusted party;
- choosing a string STR comprising information concerning at least one action to be carried out by a trusted party before the latter makes available a decrypted form of the message;
- computing:

$z \leftarrow \#(STR)$ where # is a hash function,
- computing:

$h \leftarrow g^r \bmod p$ where r is a secret;
- encrypting the message m by computing:

$J \leftarrow f(y^{r \cdot z}, m)$ where f( ) is an invertible operation;
- exporting the string STR and the values h and J.

According to a third aspect of the present invention, there is provided cryptographic apparatus comprising a first computing entity comprising:
- an input arrangement for receiving a public key for which there exists a corresponding private key held by a second computing entity,
- a key-processing arrangement arranged to modify the public key by exponentiating at least one element of the received public key using as exponent a hash of a string, this string comprising information concerning at least one action to be taken by the second computing entity, and
- an output arrangement for making available the string to the second computing entity to enable the latter to modify its private key to complement the modified public key.

According to a fourth aspect of the present invention, there is provided a trusted-party entity comprising:
- a data store for storing a secret x and public parameters p and g;
- an input arrangement for receiving values h and J and a condition string STR from a message sender, the condition string comprising at least one condition to be checked by the trusted party;
- a processing arrangement arranged to compute:

$z \leftarrow \#(STR)$; and $f^{-1}(J, h^{z \cdot x})$ where $f^{-1}(\ )$ inverts an invertible operation $f(\ )$, whereby to produce a result which corresponds to a decrypted message m when:
    - the received value of h corresponds to $g^r$ mod p where r is a secret belonging to the sender, and
    - the received value of J corresponds to $f(g^{r \cdot x \cdot z}, m)$;
- an output arrangement for outputting said result; and
- a control arrangement arranged to check that said at least one condition contained in the string has been met, and only permit the processing arrangement to compute said result, or only permit said output arrangement to output said result, where said at least one condition has been met.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
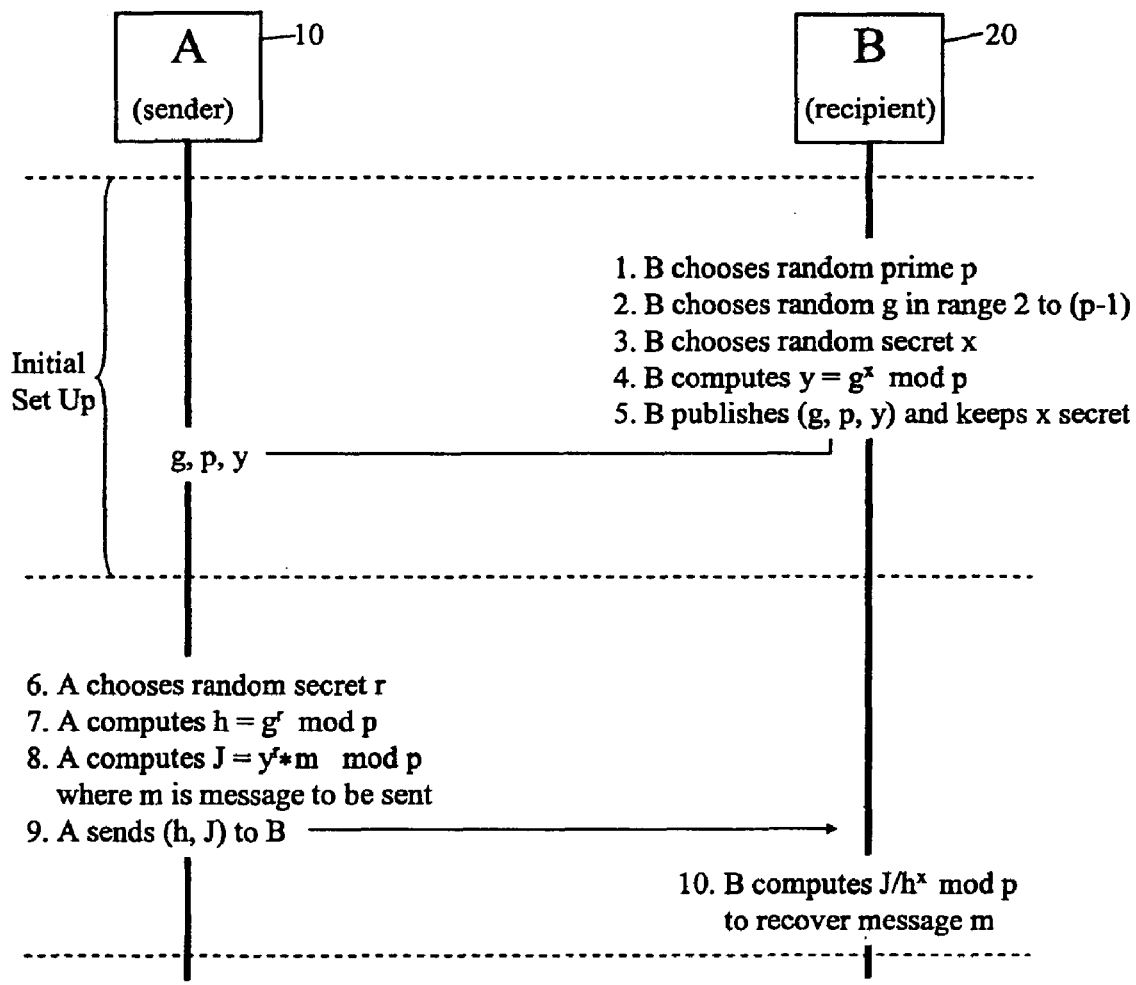
FIG. 1 is a diagram illustrating the operational steps of the prior art ElGamal public key encryption/decryption method.

The cryptographic methods and apparatus described below with respect to FIGS. 1 to 3 involve two or three parties, namely a message sender A acting through computing entity 10, a message receiver B acting through computing entity 20, and a trusted authority TA acting through computing entity 50 (this latter entity is not present in the prior art method and apparatus illustrated in FIG. 1). The computing entities 10, 20 and 50 are typically based around program-controlled processors though some or all of the cryptographic functions may be implemented in dedicated hardware. The entities 10, 20 and 50 inter-communicate, for example, via the internet or other computer network though it is also possible that two or all three entities actually reside on the same computing platform. For convenience, the following description is given in terms of the parties A, B and TA, it being understood that these parties act through their respective computing entities. It is also to be understood that the message sent by the message sender to the message receiver can comprise any content and can, for example, simply be a symmetric cryptographic key.

As preferred embodiments of the invention are based on the ElGamal encryption/decryption scheme, this latter scheme will first be briefly reviewed with reference to FIG. 1 in order to facilitate an understanding of the subsequently-described embodiments of the present invention. It is, however, to be understood that part of the contribution made by the inventors of the present invention is the appreciation of the possibilities offered by the ElGamal scheme in respect of IB cryptography as well as how these possibilities can be realised in practice.

Initial Set Up Phase
1. B chooses random prime p.
2. B chooses a random number g in the range 2 to (p-1).
3. B chooses a secret x.
4. B computes $y = g^x$ mod p.
5. B publishes (g, p, y) and keeps x secret.

Message Transfer Phase

Message Encryption by Sender A
6. A chooses a secret r.
7. A computes $h = g^r$ mod p
8. A computes $J = (y^r) * m$ mod p where m is the message to be encrypted
9. A sends (h, J) to B.

Message Decryption by Recipient B
10. B computes $J/h^x$ mod p to recover the message m.

As will be appreciated by persons skilled in the art, the sender A and recipient B can be considered as having effected a Diffie-Hellman type key exchange in that the quantity $y^r$ mod p computed by the sender A is equivalent to the quantity $h^x$ mod p computed by the recipient, (both these quantities corresponding to $g^{r \cdot x}$ mod p, the Diffie-Hellman key distributed between A and B). However, it is also possible to consider the process in terms of B having a public key (g, p, y) and a private key x, the sender A using B's public key to encrypt the message m and B using its private key to recover the message.

Figure 2:
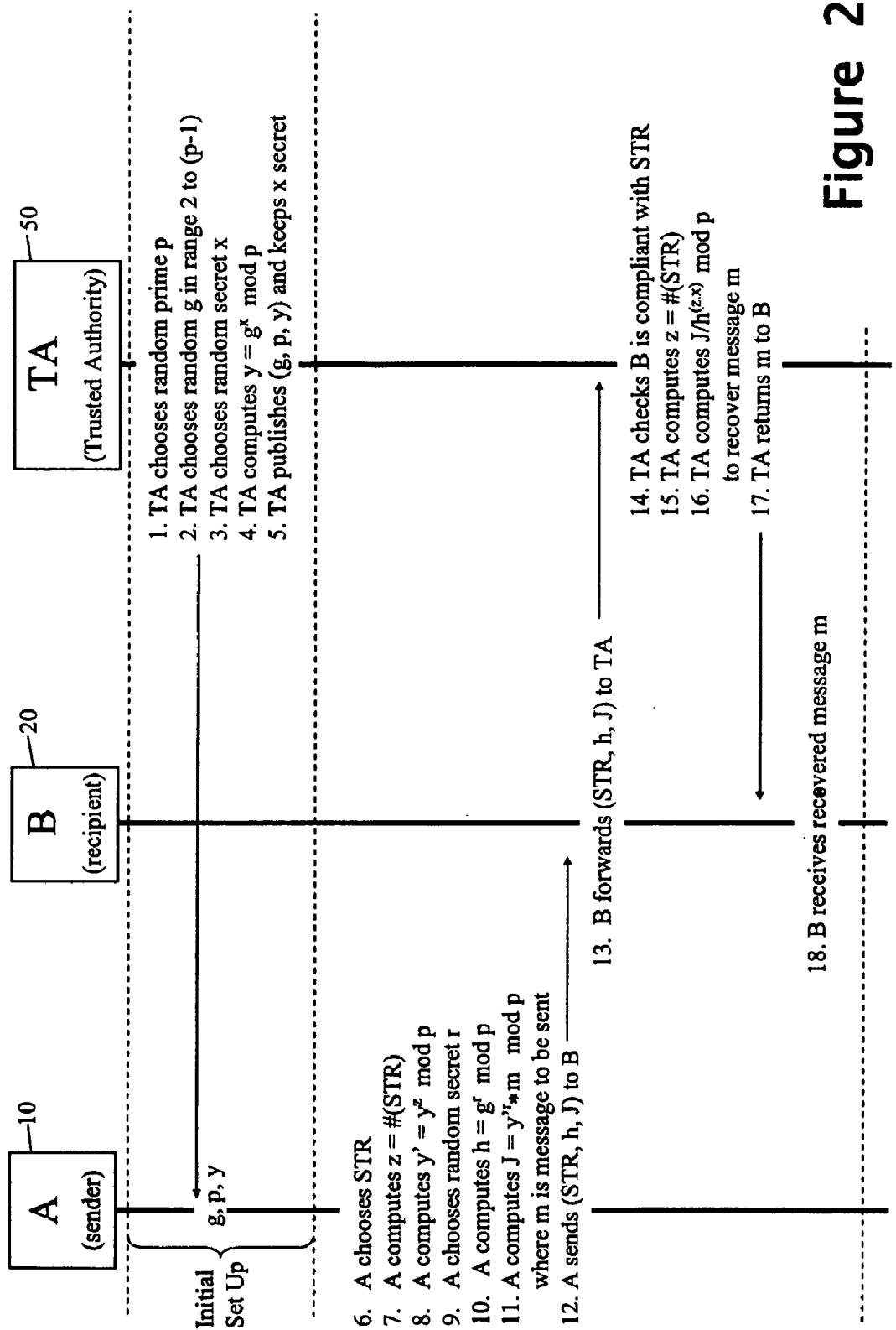
FIG. 2 is a diagram illustrating the operational steps of an identifier-based cryptographic method embodying the invention.

Turning now to a consideration of embodiments of the present invention, in the FIG. 2 embodiment the public/private keys belong to the trusted authority TA which is arranged to decrypt a message encrypted by the sender A. The encryption process effected by the sender A involves the use of a sender-chosen "identifier" string that comprises information concerning one or more actions (typically the checking of conditions indicated in the string) to be effected by the trusted authority before it decrypts the message, or before it releases the decrypted message to the recipient B. The string is provided to the trusted party and is a required component of the decryption process whereby any change in the string will result in a failure to correctly decrypt the message. The detailed steps of the FIG. 2 method are set out below together with indications of typical bit sizes of the important quantities involved.

Initial Set Up Phase
1. TA chooses random prime p (for example, 1024 bits).
2. TA chooses a random number g in the range 2 to (p-1).
3. TA chooses a secret x (for example, a random, 160 bit, number).
4. TA computes $y=g^x \bmod p$.
5. TA publishes (g, p, y) and keeps x secret.

Message Transfer Phase

Message Encryption by Sender A
6. A chooses an identifier string STR.
7. A computes $z=\#(STR)$ where # is a hash function (for example, SHA-1 returning 160 bits).
8. A computes $y'=y^z \bmod p$
9. A chooses a secret r (for example a random, 160 bit, number)
10. A computes $h=g \bmod p$
11. A computes $J=(y'^r)*m \bmod p$
12. A sends (STR, h, J) to B and destroys r.
(Steps 8 and 11 can be merged to have A compute J as: $(y^{z \cdot r})*m \bmod p$)

Message Decryption for Recipient B by Trusted Authority TA
13. B forwards (STR, h, J) to TA.
14. TA checks that B meets the conditions set out in STR.
15. TA computes $z=\#(STR)$.
16. TA computes $J/h^{(z \cdot x)} \bmod p$ to recover the message m.
17. TA returns message m to B.
18. B receives recovered message m.

The transmissions are preferably integrity protected in any suitable manner.

With z and r both 160 bits, the main computational load on the sender is one 160-bit exponentiation and one 320-bit exponentiation (assuming steps 8 and 11 are combined), whilst the main computational load on the TA is one 320-bit exponentiation and one inversion.

It will be appreciated by persons skilled in the art that g should be chosen randomly but such that:

$$g^q = 1 \bmod p$$

where q is a large prime (typically at least 160 bits) that divides (p-1).

It should be noted that the multiplication effected in step 11 can be replaced by any modulo-p invertible operation for combining $y^{r \cdot z}$ and m (the operation being inverted in step 16). Thus, for example, J can be computed as:

$$m \oplus H(y^{r \cdot z} \bmod p)$$

where $\oplus$ is the Exclusive-OR function and H is a hash function. The message is subsequently recovered by the TA computing:

$$J \oplus H(h^{x \cdot z} \bmod p).$$

As regards the contents of the string STR chosen by the sender, as already indicated this string may be any string though in many cases restrictions will be placed on the string—for example, the string STR may be required to comply with a particular XML schema.

Generally, the string STR is used to convey to the trusted authority information concerning actions to be taken by the trusted authority when it receives the encrypted message for decryption. The information in the string STR may relate to actions to be taken by the trusted authority that do not affect message decryption—for example, the trusted authority TA may be required to send a message to the message sender A at the time the TA decrypts the message concerned. However, the information in the string STR will frequently specify one or more conditions to be checked by the trusted authority as being satisfied before the trusted authority decrypts the related encrypted message (or before returning the corresponding decrypted message to the recipient B concerned).

For example, the string STR may comprise a recipient identity condition identifying a specific intended message recipient; in this case, the trusted authority carries out an authentication process with the recipient B presenting the related message for decryption to check that the recipient concerned meets the recipient-identity condition.

Rather than identifying an intended recipient as a particular individual, the string STR may comprise one or more conditions specifying one or more non-identity attributes that the recipient must possess; for example, a condition may specify that a recipient must have a certain credit rating. Again, it is the responsibility of the trusted authority to check out this condition before producing the decrypted message for a recipient presenting the encrypted message for decryption.

The string STR may additionally or alternatively comprise one or more conditions unrelated to an attribute of the intended recipient; for example, a condition may be included that the message concerned is not to be decrypted before a particular date or time.

Whatever the conditions relate to, the string STR may directly set out the or each condition or may comprises one or more condition identifiers specifying corresponding predetermined condition known to the trusted authority (in the latter case, the trusted authority uses the or each condition identifier to look up the corresponding condition to be checked).

In overview of the FIG. 2 method, like the prior art method of FIG. 1, it is possible to consider what is happening in terms of the Diffie-Hellman key distribution process. More particularly, the actions of the sender can be viewed as equivalent to:
deriving a Diffie-Hellman key ($g^{r \cdot x}$) from the key material y provided by the trusted party and the sender secret r;
exponentiating, modulo p, the Diffie-Hellman key using the string hash z as exponent,
using the exponentiated key ($g^{r \cdot x \cdot z}$) to effect a modulo-p invertible operation involving the message m thereby to form an encrypted message.

Similarly, the actions of the TA can be viewed as equivalent to:
deriving the Diffie-Hellman key ($g^{r \cdot x}$) from the sender key material h and the TA's secret x,
exponentiating, modulo p, the Diffie-Hellman key using the string hash z as exponent,
applying the exponentiated key ($g^{r \cdot x \cdot z}$) to the encrypted message to invert the sender-effected invertible operation thereby to recover the message.

Alternatively, viewed in terms of the TA having a public key (p, g, y) and private key (x), in the FIG. 2 process the sender A effectively modifies the TA public key using the hash of the string STR as an exponent for exponentiation, modulo p, of the element y of that key. The sender A also supplies the string to the TA to enable it to effect a complementary modification to its private key by multiplying the private key x by the hash of the string. Where the string comprises information serving to identify an intended recipient B of the message m, the modification of the TA's public key can be thought of as a customization of the public key to the intended recipient B. This process of modifying another party's public key by using the hash of a string STR as an exponent for exponentiation of at least an element of the public key, is not restricted to the ElGamal-based encryption/decryption described above and can be effected in connection with any suitable cryptographic process.

A potential drawback of the FIG. 2 embodiment is that the TA can read the messages m. In order to prevent this, B can blind the encrypted message before sending it to TA for decryption, B subsequently un-blinding the decrypted, but still blinded, message returned by the TA to recover the message m. By way of example, step 13 of FIG. 2 can be replaced by:

13a. B chooses a blinding secret k (for example, 1024 bits).
13b. B computes J'=J.k mod p
13c. B sends (STR, h, J') to TA The TA carries out its processing steps 14 to 18 as before but using J' rather than J; the result of step 16 is now the recovery of mk—that is, the blinded but decrypted message—rather than the message m. In order for B to un-blind the message, step 18 now becomes:

18a. B receives the blinded, decrypted message mk.
18b. B computes (mk/k) mod p to recover the message m; thereafter, B destroys k.

Figure 3:
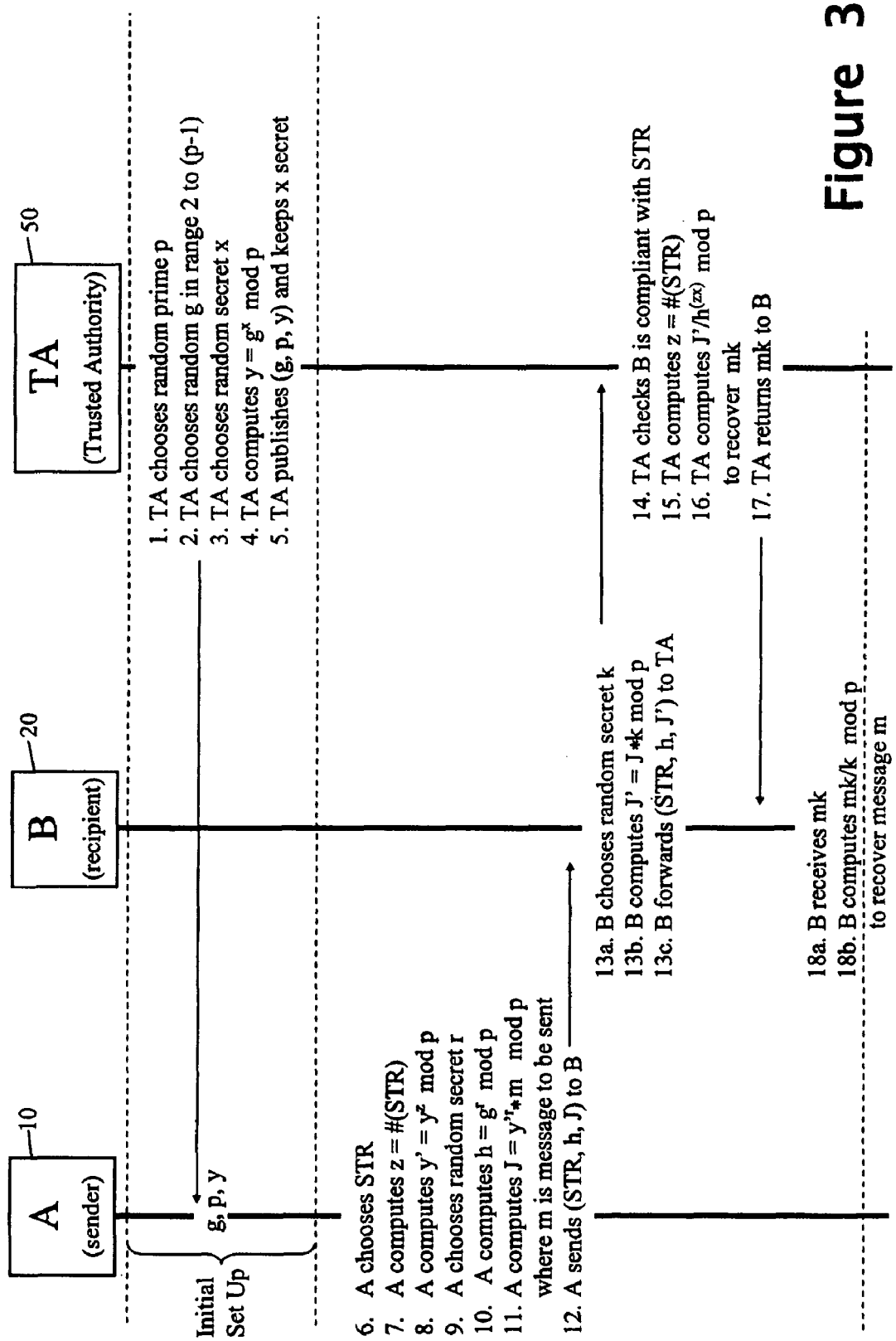
FIG. 3 is a diagram similar to that of FIG. 2 but illustrating the inclusion of addition blinding and un-blinding operational steps.

The full process including the above blinding is shown in FIG. 3.

It will be appreciated that the blinding/un-blinding operations can differ from those described above. For example, blinding can be effected by computing a modulo-p division of J by k, in which case un-blinding would be effected by a modulo-p multiplication by k of the decrypted, but still blinded, message returned by the TA.

Many variants are possible to the above-described embodiments of the invention. Thus, in certain situations it may be required that a message should only be decryptable with the cooperation of multiple trusted authorities each of which would typically have a different associated public and private data. One such situation where this may be desirable is where the sender wishes to impose multiple conditions but no single trusted authority is competent to check all conditions—in this case, different trusted authorities can be used to check different conditions. Another situation in which multiple trusted authorities may be required is where there is a concern that a trust authority may have access to the encrypted, but not blinded, messages passing from A to B and it is important to prevent the trust authority reading the messages—in this case, multiple trusted authorities can be used together in a manner such that no one authority can read the messages passing from A to B.

Various arrangements are possible for involving multiple trusted authorities, including:

the sender organizes the message content as a number of data sets (say k data sets) by using Shamir's secret sharing scheme and then encrypts each data set using an associated string STR (for example, specifying a respective condition to be checked) and the public modulus of a respective one of the trusted authorities; in order to retrieve the message, a recipient B has to go to all of the trusted authorities in order to decrypt all of the data sets because any k−1 data sets or less cannot disclose any of the message contents.

the sender can use the encrypted data resulting from encrypting message data using a first string (for example, specifying a particular condition) and the public modulus of a first trusted authority as the data to be encrypted using a second string and the public modulus of a second trusted authority and so on; the encrypted data resulting from the encryption effected in respect of all trusted authorities to be used then being sent to the recipient B for decryption in successive decryption operations by the corresponding trusted authorities.

The invention claimed is:

1. A cryptographic method in which a sender encrypts and sends a message to a recipient for decryption by a trusted party, the sender being in possession of a public key for which there exists a corresponding private key held by the trusted party, the method comprising:

the sender employing a computing apparatus to encrypt the message using a modified public key that results from exponentiating at least one element of the public key using as exponent a hash of a string that comprises information concerning at least one action to be taken by the trusted party;

the recipient receiving the encrypted message and said string and passing them to the trusted party;

the trusted party employing a computing apparatus to decrypt the encrypted message using a modified private key that results from using the string to modify the private key to complement the modified public key; and the trusted party returning the decrypted message to the recipient after carrying out said at least one action with a satisfactory conclusion.

2. A method according to claim 1, wherein:

the public key comprises elements p, g and y, the element y corresponding to $g^x$ mod p, where x is a private key belonging to the trusted party; and the sender modifies the public key by effecting a modulo-p exponentiation of the element y using the hash of said string as exponent.

3. A method according to claim 2, wherein the trusted party modifies its private key, in relation to use in connection with the modified public key, by an operation equivalent to multiplying its private key by the hash of the string.

4. A method according to claim 2, wherein:

the sender uses the modified public key to encrypt the message m by effecting a modulo-p exponentiation of the modified public key element using a secret r as exponent, and then combining the result and the message m using a modulo-p invertible operation to form a value J;

the sender sends to the recipient, in addition to the string, the value J and a value h corresponding to $g^r$ mod p.

5. A method according to claim 4, wherein the public-key related exponentiations effected by the sender are effected together as a single exponentiation operation.

6. A method according to claim 4, wherein said invertible operation comprises multiplying the message by the said result of exponentiation of the modified public key element using the secret r.

7. A method according to claim 6, wherein the trusted party decrypts the encrypted message by computing a value z as the hash of said string and then computing:

$$J/h^{z \cdot x} \bmod p;$$

the trusted party only decrypting the message, or only releasing the decrypted message, after carrying out said at least one action with a satisfactory conclusion.

8. A method according to claim 7, wherein:

the recipient prior to forwarding the value J to the trusted party for decryption, subjects the value J to a modulo-p blinding operation using a factor k where k is a secret random number; and the trusted party provides the decrypted, but still blinded message, back to the recipient provided said at least one action has been carried out with a satisfactory conclusion, the recipient thereupon canceling the blinding to recover the message.

9. A method according to claim 4, wherein said invertible operation comprises effecting an exclusive OR combination of the message with a hash of the said result of exponentiation of the modified public key element using the secret r.

10. A method according to claim 9, wherein the trusted party decrypts the encrypted message by computing a value z as the hash of said string and then computing:

$$J \oplus H(h^{z \cdot x} \bmod p)$$

where $\oplus$ is the Exclusive-OR function and H is a hash function;
the trusted party only decrypting the message, or only releasing the decrypted message, after carrying out said at least one action with a satisfactory conclusion.

11. A method according to claim 10, wherein:
the recipient prior to forwarding the value J to the trusted party for decryption, subjects the value J to a modulo-p blinding operation using a factor k where k is a secret random number; and
the trusted party provides the decrypted, but still blinded message, back to the recipient provided said at least one action has been carried out with a satisfactory conclusion, the recipient thereupon canceling the blinding to recover the message.

12. A method according to claim 1, wherein said at least one action comprises a check that a condition has been met.

13. A method according to claim 1, wherein said at least one action comprises a check relating to the identity of the recipient.

14. A cryptographic method, wherein a trusted party with secret x and public parameters p and g, effects at least steps of:
receiving values h and J and a condition string STR from a message sender, the condition string comprising at least one condition to be checked by the trusted party; and
employing a computing apparatus arranged to compute:

$$z \leftarrow \#(STR) \text{ and } f^{-1}(J, h^{z \cdot x})$$

where $f^{-1}(\ )$ inverts an invertible operation $f(\ )$, whereby to produce a result which corresponds to a decrypted message m when:
the received value of h corresponds to $g^r \bmod p$ where r is a secret belonging to the sender, and
the received value of J corresponds to $f(g^{r \cdot x \cdot z}, m)$; and
the trusted party only computing said result, or only releasing the result, after confirming that said at least one condition contained in the string has been met.

15. A method according to claim 14, wherein $f^{-1}(\ )$ corresponds to computing:

$$J/h^{z \cdot x} \bmod p$$

the result being the message m when the received value of J is: $(g^{r \cdot x \cdot z})*m \bmod p$.

16. A method according to claim 14, wherein $f^{-1}(\ )$ corresponds to computing:

$$J \oplus H(h^{z \cdot x} \bmod p)$$

where H is a predetermined hash function, the result being the message m when the received value of J is: $m \oplus H(g^{r \cdot x \cdot z}) \bmod p$.

17. Cryptographic apparatus comprising a sender computing entity and trusted-party computing entity, the sender computing entity comprising:
an input arrangement for receiving a public key for which there exists a corresponding private key held by the trusted-party computing entity;
a processing arrangement arranged to modify the public key by exponentiating at least one element of the public key using as exponent a hash of a string that comprises information concerning at least one action to be taken by the trusted-party computing entity, and to use the modified public key to encrypt a message m; and
an output arrangement for making available the string to the second computing entity to enable the latter to modify its private key to complement the modified public key;
the trusted-party computing entity comprising:
an input arrangement for receiving the encrypted message and said string;
a processing arrangement arranged to use said string to modify its private key to complement the modified public key, and to decrypt said message using the modified private key; and
an output arrangement for passing the decrypted message to a recipient computing entity;
the processing arrangement of the trusted-party computing entity being further arranged to carry out said at least one action and to only make available the decrypted message to the recipient computing entity upon a satisfactory conclusion to carrying out said at least one action.

18. Apparatus according to claim 17, wherein the received public key comprises elements p, g and y, the element y corresponding to $g^x \bmod p$, where x is a private key belonging to the trusted-party computing entity; the processing arrangement of the sender computing entity being arranged to modify the public key by effecting a modulo-p exponentiation of the element y using the hash of said string as exponent.

19. Apparatus according to claim 18, wherein the processing arrangement of the sender computing entity is arranged to encrypt the message m by effecting a modulo-p exponentiation of the modified public key element using a secret r as exponent, and then combining the result and the message m using a modulo-p invertible operation to form a value J; the output arrangement of the sender computing entity being arranged to make available the value J and a value h corresponding to $g^r \bmod p$.

20. Apparatus according to claim 19, wherein the processing arrangement of the sender computing entity is arranged to carry out said invertible operation by multiplying the message by the said result of exponentiation of the modified public key element using the secret r.

21. Apparatus according to claim 20, wherein the processing arrangement of the trusted-party computing entity is arranged to decrypt the encrypted message by computing a value z as the hash of said string and then computing:

$$J/h^{z \cdot x} \bmod p.$$

22. Apparatus according to claim 21, further comprising said recipient computing entity, the recipient computing entity being arranged to receive the value J and to subject it to a modulo-p blinding operation using a factor k where k is a secret random number, before forwarding the blinded value J to the trusted-party computing entity;
the trusted-party computing entity being arranged to carry out message decryption and return the decrypted, but still blinded message, back to the recipient computing entity provided said at least one action has been carried out with a satisfactory conclusion; and the recipient computing entity being further arranged to receive the decrypted, but still blinded, message and to cancel the blinding to recover the message.

23. Apparatus according to claim 19, wherein the processing arrangement of the sender computing entity is arranged to carry out said invertible operation by effecting an exclusive OR combination of the message with a hash of the said result of exponentiation of the modified public key element using the secret r.

24. Apparatus according to claim 23, wherein the processing arrangement of the trusted-party computing entity is arranged to decrypt the encrypted message by computing a value z as the hash of said string and then computing:

$$J \oplus H(h^{z \cdot x} \bmod p)$$

where $\oplus$ is the Exclusive-OR function and H is a hash function;

the trusted-party computing entity being further arranged to only decrypt the message, or only release the decrypted message, after carrying out said at least one action with a satisfactory conclusion.

25. Apparatus according to claim 24, further comprising a recipient computing entity, the recipient computing entity being arranged to receive the value J and to subject it to a modulo-p blinding operation using a factor k where k is a secret random number, before forwarding the blinded value J to the trusted-party computing entity; the trusted-party computing entity being arranged to carry out message decryption and return the decrypted, but still blinded message, back to the recipient computing entity provided said at least one action has been carried out with a satisfactory conclusion; and the recipient computing entity being further arranged to receive the decrypted, but still blinded, message and to cancel the blinding to recover the message.

26. A trusted-party entity comprising:

a data store for storing a secret x and public parameters p and g;

an input arrangement for receiving values h and J and a condition string STR from a message sender, the condition string comprising at least one condition to be checked by the trusted party;

a processing arrangement arranged to compute:

$$z \leftarrow \#(STR); \text{ and } f^{-1}(J, h^{z \cdot x})$$

where $f^{-1}(\ )$ inverts an invertible operation $f(\ )$, whereby to produce a result which corresponds to a decrypted message m when:

the received value of h corresponds to $g^r \bmod p$ where r is a secret belonging to the sender, and the received value of J corresponds to $f(g^{r \cdot x \cdot z}, m)$;

an output arrangement for outputting said result; and a control arrangement arranged to check that said at least one condition contained in the string has been met, and only permit the processing arrangement to compute said result, or only permit said output arrangement to output said result, where said at least one condition has been met.

27. A trusted-party entity according to claim 26, wherein $f^{-1}(\ )$ corresponds to computing:

$$J/h^{z \cdot x} \bmod p$$

the result being the message m when the received value of J is: $(g^{r \cdot x \cdot z}) * m \bmod p$.

28. A trusted-party entity according to claim 26, wherein $f^{-1}(\ )$ corresponds to computing:

$$J \oplus H(h^{z \cdot x} \bmod p)$$

where H is a predetermined hash function, the result being the message m when the received value of J is: $m \oplus H(g^{r \cdot x \cdot z}) \bmod p$.

29. A trusted-party entity according to claim 26, wherein the received value of J is a blinded value whereby said result is a blinded result.

* * * * *